(12) United States Patent
Klassen

(10) Patent No.: US 7,123,381 B2
(45) Date of Patent: Oct. 17, 2006

(54) SYSTEM AND METHOD OF TRAPPING FOR CORRECTING FOR SEPARATION MISREGISTRATION IN COLOR PRINTING

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 225 days.

(21) Appl. No.: 10/190,098

(22) Filed: Jul. 3, 2002

(65) Prior Publication Data
US 2003/0090689 A1 May 15, 2003

Related U.S. Application Data

(62) Division of application No. 09/176,969, filed on Oct. 22, 1998, now abandoned.

(51) Int. Cl.
G06F 15/00 (2006.01)
G06K 9/00 (2006.01)
G06K 9/36 (2006.01)

(52) U.S. Cl. .................. 358/1.9; 358/1.1; 358/1.9; 382/162; 382/167

(58) Field of Classification Search ................ 358/1.9, 358/1.1, 1.4, 1.11, 1.14–1.16, 515, 518; 395/101, 395/104, 109; 382/162, 167; 345/598, 603
See application file for complete search history.

(56) References Cited

U.S. PATENT DOCUMENTS

| 4,583,116 | A |   | 4/1986  | Hennig et al. ............ 358/75 |
|-----------|---|---|---------|----------------------------------|
| 4,700,399 | A |   | 10/1987 | Yoshida ................... 382/17 |
| 4,725,966 | A |   | 2/1988  | Darby et al. ............ 364/518 |
| 4,931,861 | A |   | 6/1990  | Taniguchi ............... 358/75 |
| 5,113,249 | A |   | 5/1992  | Yosefi .................... 358/75 |
| 5,131,058 | A |   | 7/1992  | Ting et al. .............. 382/47 |
| 5,204,918 | A |   | 4/1993  | Hirosawa ................ 382/41 |
| 5,241,396 | A |   | 8/1993  | Harrington ............. 358/296 |
| 5,295,236 | A |   | 3/1994  | Bjorge et al. ........... 395/134 |
| 5,313,570 | A |   | 5/1994  | Dermer et al. ......... 395/131 |
| 5,386,223 | A |   | 1/1995  | Saitoh et al. .......... 346/157 |
| 5,386,483 | A |   | 1/1995  | Shibazaki ............... 382/22 |
| 5,402,530 | A |   | 3/1995  | Boenke et al. ......... 395/112 |
| 5,440,652 | A |   | 8/1995  | Ting ..................... 382/165 |
| 5,513,300 | A |   | 4/1996  | Shibazaki ............... 395/112 |
| 5,542,052 | A |   | 7/1996  | Deutsch et al. ........ 395/131 |
| 5,613,046 | A |   | 3/1997  | Dermer ................. 395/109 |
| 5,615,314 | A |   | 3/1997  | Schoenzeit et al. .... 395/114 |
| 5,666,543 | A | * | 9/1997  | Gartland ................ 715/526 |
| 5,668,931 | A | * | 9/1997  | Dermer ................. 358/1.4 |
| 6,006,013 | A | * | 12/1999 | Rumph et al. ......... 358/1.15 |
| 6,084,684 | A |   | 7/2000  | Hamburg                          |

FOREIGN PATENT DOCUMENTS

EP 0445066 A 4/1991

OTHER PUBLICATIONS

Lawler, "The Complete Book of Trapping", Hayden Books, 1995, pp. 21 and 22.
A.R. Robertson, "Historical Development of CIE Recommended Color Difference Equations", Color Research and Applications, 15, (3) Jun. 1990.
Zhang & Wandell, "A Spatial Extension of CIELab for Digital Color Image Reproduction", SID 96.

* cited by examiner

Primary Examiner—Gabriel Garcia
Assistant Examiner—Thierry L. Pham

(57) ABSTRACT

A color printing system which deposits colors on a separation by separation basis provides trapping to correct misregistration between printer output colors due to imperfect placement of the separation colors. The system includes a trapping calculation processor, determining trapping requirements based on visibility, measured in a color space in which equivalent color differences in human color perception are approximately equivalent values.

51 Claims, 7 Drawing Sheets

IDEAL IMAGE EDGE

NON IDEAL IMAGE
WITH MISREGISTRATION

SYSTEM AND METHOD OF TRAPPING FOR CORRECTING FOR SEPARATION MISREGISTRATION IN COLOR PRINTING

CROSS REFERENCE

This is a divisional of application Ser. No. 09/176,969 filed Oct. 22, 1998 now abandoned.

This invention relates to electronic processing of graphic images to produce multi-color prints using multiple separations. Typically, four process color inks, cyan, magenta, yellow and black are used, to print multiple separations, which tend to have minor misregistration problems. Trapping is a process for adjusting images to correct for misregistration. The present invention is directed to a process for controlling trapping, based on the appearance of any misregistration artifacts against the remainder of the image.

BACKGROUND OF THE INVENTION

The layout of a page or graphic image depends upon combining "structured graphics" according to a pre-established graphic design. The structured graphics are contiguous regions of color, usually represented in a plurality of separation images, in turn representing a succession of graphic objects imaged on the printing medium (e.g. the "paper"). The objects so imaged are shapes which can be isolated from each other, can abut one another at one or more points, can partially overlap one another, or can completely overlap one another. The resulting printed page or graphic image is therefore made up of a patchwork of shapes representing the graphic objects, some of which are "clipped" (or hidden) by objects imaged later in the succession.

The result of abutting or overlapping shapes is a boundary between adjacent regions of color which, under ideal printing conditions should have zero width. That is, the one color should stop exactly where the other begins, with no new colors introduced along the boundary by the printing process itself. The "colors" which fill the shapes can be solid colors, tints, degrades, contone images, or "no fill" (i.e., the paper with no ink applied). In general, the "colors" represented in these adjacent regions are printed using more than one colorant. In practice therefore, the realization of a zero width boundary between regions of different color is impossible as a result of small but visible misregistration problems from one printed separation to another. The error is manifested as a "light leak" or as a visible boundary region of an undesired color.

As an example, FIG. 1A shows an ideal boundary between a red region on the right and a cyan region on the left, while FIG. 1B shows a non-ideal boundary, resulting from a slight misregistration of the magenta separation to the left on the page. Between the red and cyan regions is formed a blue line, from the unintended combination of cyan and magenta. On the right-hand side of the red region will be formed a yellow line, again resulting from a slight misregistration of the magenta separation to the left on the page.

The problem of misregistration is a mechanical problem, almost always existing in printing systems. The problem arises because color separations are not laid exactly where intended, due to inherent imperfections in any separation registration process. It is somewhat correctable by mechanical registration methods; however it is rarely completely correctable. In expensive, high end printing processes, customers have high expectations that misregistration artifacts will not be visible. In inexpensive, low end printers, mechanical registration techniques are so expensive as to make correction or trapping essential.

As will become apparent, different printing technologies have distinct misregistration artifacts. Offset printing tends to have uniform misregistration in all directions. However, xerographic printing tends to have more misregistration in a single direction.

Methods for correcting for this misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone".

Commonly used methods for automatic trapping of digital images fall into the categories of vector-based and raster-based methods. Vector-based methods rely on images that have been converted from a page-description language form, describing objects as characters, polygonal shapes, etc. into an internal data structure containing not only object information, but also a list of all the edges between regions of different color. Raster-based methods rely on images that have been first scanned or converted from page-description based form and are stored internally as a sequence of (high resolution) scan lines each containing individual scan elements or pixels. These methods process each raster line in sequence and compare one or more adjacent pixels to determine color boundaries. After some initial processing to find edges, both vector-based and raster-based methods apply rules for determining whether or not to create a trap at such boundaries, and finally apply a second set of rules to determine the nature of the trap if one is to be created.

Thus, it can be seen at FIG. 2 that most trapping processes take the following format which shall be referenced throughout this discussion.

A. Find edges in the image, no matter how described (step 101);

B. For each pair of colors on each side of the found edge, determine:
  1) Whether trapping should be used (step 102)
  2) If so, what color should be used (step 103), and
  3) Where should that color be located or placed (step 104)

C. Modify the image accordingly (Step 105).

The present invention focuses on several elements of step B. Edge detection and image manipulation to perform trapping may be done in any of several standard processes.

For example, the method of Taniguchi, described in U.S. Pat. No. 4,931,861, uses two rasterized images representing abutting or overlapping objects within an image field to define a third binary image representing the map of the pixels which make up the borders between the first and second images. These three images are superimposed, pixel by pixel, to create a fourth and final binary image.

The method of Darby et al., described in U.S. Pat. No. 4,725,966, again defined on a pixel basis, uses a mask which is moved, one resolution element at a time, to evaluate the presence or absence of (pixel) colors upon which a positive or negative spread decision is based.

The method of Yosefi, described in U.S. Pat. No. 5,113,249, uses a set of automated rules as the basis for deciding, for each pair of abutting or overlapping shapes, whether or not to create a trap (an overlap region referred to as a "frame"), and, if so, the nature of the trap to create. The embodiment described by Yosefi makes use of scanned data, and processes each line of pixels in order, comparing for each pixel three pixels from the previous scan line and two pixels from the same line to determine if a color change has occurred. The decisions regarding whether or not to create a trap, and the nature of such a trap if created are imbedded within the processing sequence, making use of criteria established prior to the onset of processing. Yosefi describes rules to follow after finding an edge and knowing the two colors. There are 24 rules based on whether the colors are tints, special colors (like gold leaf), black, yellow, "window" (meaning scanned image) and various combinations.

A commercially available product, "TrapWise", from Aldus Corporation, Seattle, Wash., also makes use of a raster approach to trapping. In this product, the processing time is proportional to the number of resolution elements, thereby increasing quadratically with resolution, and leading to greater computation times for high device resolution, e.g., 3600 dots per inch (d.p.i.). Furthermore, traps are created with this package using pre-set rules, and are not editable by a user without the requirement for repeating the computation.

U.S. Pat. No. 4,583,116 to Hennig et al. describes a trapping process that evaluates the darkness on both sides of an edge in order to determine which object determines the contour. The object determining the contour is left unchanged. The other object is spread under it. The fill is constant, and matches the value of the separation being spread. The "darkest" separation is used to determine the contour and kept constant, while the lighter separations are all spread.

U.S. Pat. No. 4,700,399 describes a method that finds edges and uses a different UCR along the edges from elsewhere to allow rich black without getting color bleeding along the edges of black objects. The method requires keeping colors away from edges of black text.

U.S. Pat. No. 4,931,861 to Taniguchi describes using binary operators to shrink or spread a shape where another shape is overlapped in another separation (thresholding is used to get these shapes). Also described is spreading where two shapes are adjacent, and do not overlap.

U.S. Pat. No. 5,131,058 to Ting et al. converts a raster to an edge-based "outline" representation. Then the outlines are spread and the resulting image is re-rasterized. Spreading is done separation-wise with a process indicating whether there is a color difference that warrants spreading/choking.

U.S. Pat. No. 5,295,236 Bjorge, et al. is believed by the applicant to represent the Adobe or Aldus TrapWise product described above. This patent describes ways of deriving the information about edges required to trap, trapping with some simple rules, and converting the traps to vectors which are converted back to PDL form.

U.S. Pat. No. 5,204,918 to Hirosawa assumes vector data as input, describing the contours, i.e., no edge detection is performed. Image parts are selected in order of increasing priority. For parts of a contour of an image part where there is a lower priority image part adjacent, two supplemental contours are generated. These are offsets at a specified distance from the original contour. A new color is computed for the entire offset region (both sides of the original, not just where there is another object). The maximum density of the two sides is used in the correction region. Minimum density might be used instead. The edge following required is either done in a frame buffer, or directly on vector data.

U.S. Pat. No. 5,402,530 to Boenke et al. uses a PDL input, and builds a data-structure using a modified Weiler algorithm to represent the contours. It is object-based, in that it considers four classes of object: interior fills, strokes on the borders of regions, text on top of regions, and text on its own.

U.S. Pat. No. 5,386,223 to Saitoh et al. addresses two-color printing, extending one color into another where they abut. It suggests that it is desirable to extend the lighter color.

U.S. Pat. No. 5,542,052 to Deutsch, et al. claims a set of geometric rules. First, a relative darkness to each color is assigned, with key being the darkest color, cyan being a middle darkness color, and yellow being the lightest color. Then, the lighter color is spread under the darker color. A trap vector is drawn in a color which is a function of the two colors abutting each side of the edge.

U.S. Pat. No. 5,313,570 to Dermer, et al. takes either raster or PDL input, and creates an intermediate, vector-based form. The manipulations themselves are based on a plane sweep algorithm generating a display list and then from that display list generating a new representation called a scan beam table. The active edge table has a polygon stack for each edge. From these representations, a boundary map is generated.

U.S. Pat. No. 5,668,931 to Dermer describes trapping rules. The overall concept is to have a set of evaluation methods, and for each candidate trap, let each of the evaluation methods decide whether it is an optimum trap. Each method ranks all of the candidate traps, and then the traps are scored, using the weighted sum of the rankings. In this way some evaluation methods are more influential than others. Candidate traps appear to consist of the typical spreads and chokes, although the disclosure suggests that reduced amounts are also possible. The evaluation methods are as follows: 1) For each possible misregistration, determine the minimum distance in CIELUV from the two bounding colors, and then use the maximum of those minima as a score; 2) Determine the CIELUV distance from the trap color to the color into which it is spread; 3) For each misregistration, determine the difference in L* values from each of the bounding colors, with the score set as the maximum value of the set—i.e., favoring relatively darker misregistration colors; 4) For each misregistration color, determining the absolute difference in L* value from each bounding color, so that the score is based only on lightness differences; 5) Determine the L* value of each misregistration color, with the score indicating dark misregistration colors; 6) Determine the L* of the bounding colors and assign a score equal to the absolute difference in L* when a dark color is spread into a light, or zero when a light color is spread into a dark, penalizing the former; 7) Use the highest percentage of yellow in a misregistration color. The weights are determined empirically, and can be adjusted over time, or as a particular application demands. They are initially determined by a least squares process based on expert evaluation of a number of calibration traps.

U.S. Pat. No. 5,613,046 to Dermer describes a user interface allowing the display of an image, and selection of any color, pair, object, edge or color and modification of the trapping behavior in terms of inward/outward, or what color, how automatic or manual to be, etc. It also allows display of the effect of any of the 16 possible misregistrations on the selected color pair, object, edge or color, with or without the current trapping applied, and to iterate through the possible modifications, applying several possible traps to see which is best.

U.S. Pat. No. 5,440,652 to Ting describes a process to find an edge and track it, building a secondary edge during processing. The secondary edge will be used as the other side of the trap region. The placement of the secondary edge and the color of the region between is determined by reference to a rule base.

U.S. Pat. No. 5,615,314 to Schoenzeit et al. describes a basic architecture for a RIP-printer interface. It includes buffering and queues and compression for transferring page images to the printer from the RIP. It also has control information, in particular, multiple copy and abort instructions. It also provides an optional dilation processor which "selectively dilates objects" in order to compensate for potential misregistration errors. There is no indication of how it selects. It dilates using "standard convolution techniques" such as taking the max of a 3×3 neighborhood.

U.S. Pat. No. 5,513,300 to Shibazaki describes trapping rasters against line art. They are concerned with the image and line art being at different resolutions. Line art is stored as run length data, and images as raster. The method forms a mask indicating where the image appears, and erodes or dilates the mask. The non-exempt separations of the image or line art are then copied into the eroded or dilated regions (respectively). A separation is exempt if the operator so indicates.

U.S. Pat. No. 5,386,483 to Shibazaki discusses finding a trapping region in a raster-based image. The image is segmented into regions, each of a constant color. Each such region is assigned a region number, and a lookup table is used to store the correspondence between region number, and colors, including both CMYK, and RGB. RGB is used by the operator supervising the process with a display and mouse. The data is then run-length encoded, using runs of color table indices. The algorithm is multi-pass. On the first pass, an eight-neighbor window is used to form a pair of "frame" regions along each color boundary. On subsequent passes, a four-neighbor set is used to extend the frame region. Finally, a color is assigned to each new region thus formed. To form a "frame" region, a three scanline buffer is used. The center pixel in a window is considered to be in the frame region if 1) the pixel is located in one of the original regions (i.e., not already in a frame region), and 2) at least one neighbor is in a different region. Regions/colors have priorities specified (by the user). When the neighbor with the highest priority is part of a frame, the frame number is used for the new region of the pixel. Otherwise, a new frame number is allocated and used. It appears that priorities don't change when pixels are assigned to frame regions.

U.S. Pat. No. 5,241,396 to Harrington describes a simple raster-based technique for protecting rich black text. Black separation images are eroded and then ANDed with each of CMY separations, to produce new cyan, magenta and yellow separations. The original black is then used as the black separation.

U.S. Pat. No. 4,700,399 to Yoshida finds edges and uses a different UCR along the edges from elsewhere to allow rich black without getting color bleeding along the edges of black objects. Colors are kept away from edges of black text.

U.S. Pat. No. 5,666,543 to Gartland and U.S. Pat. No. 5,542,052 describes an arrangement providing a prolog substituted to turn on trapping. The prolog instructs the RIP to build a "shape directory" and then to trap the objects in the shape directory. The shape directory appears to be a back-to-front display list. Objects are processed in the back-to-front order. If they overlap existing objects, they are trapped against them. If the existing object already has been trapped, the traps are undone before the new traps are introduced. Thus traps are introduced as objects are processed, possibly causing a region to be trapped and re-trapped as the traps are covered up. The decision of whether to trap includes text point size and changes in separation strength.

The trapping methods described in the above cited prior art references have two common features. The first is that most process images represented in raster form. This feature places a requirement for extra processing steps in images which constitute primarily structured graphics or which combine structured graphics with contone images. Such images must first be rasterized at the output resolution, and then the appropriate line-scan algorithm applied.

The second common feature of prior art methods is the necessity to make and apply trapping decisions within the processing based upon pre-established criteria. For raster based processing at high output device resolution, the potential number of pixel-to-pixel color transitions is large due to repetition of transitions corresponding to a single color region border shared by many scan lines.

Many rule-based methods exist in the prior art for automatic determination of the particular trap to be specified for a given combination of bounding colors. For example, in U.S. Pat. No. 5,113,249, a set of logical tests is used in sequence to differentiate between pre-established generic color-pair categories, with a rule applied to each color pair. Such built-in rule systems attempt to replicate the human aesthetic judgment used in manual specification of traps and each can provide results satisfactory to an "expert" user in most cases while failing to do so in other special situations. Without a means for configuring the automatic trap selection method, a user is forced to rely on manual trap specification, even for routine operations.

The specification of a trap at the boundary between two color regions does not in itself eliminate the misregistration of printing plates, but reduces the visual effect of misregistration within the trap zone through proper choice of the trap operation. In the event of plate misregistration involving a color separation for which a trap has been specified, additional "secondary" effects occur. The secondary effects should not cause the image to be worse than when untrapped.

Prior trapping methods describe using either luminance, which is a somewhat poorly defined term, or a different and more precise parameter called lightness in determining whether to trap. The methods described use luminance or lightness values directly by assessing the difference in luminance (in some cases) or lightness (in other cases) across an edge in order to decide whether to generate a trapping zone. Generally, these values are not used in more precise measures of human perception, however. As a result, the use of luminance or lightness contrast across an edge does not always provide an adequate indicator of whether a gap created by misregistration will be visible at the edge.

Yet another problem associated with trapping is where to put the trap color. Yosefi, above indicates that this is done by spreading the darker separations of the lighter color in the direction of the darker color. Much the same approach is indicated in the specifications of other patents that address the issue: make a trap region that consists of the dark separations of the light color and the remaining separations of the dark color, and put the trap region on the dark side of the edge. Lawler, "The Complete Book of Trapping" Hayden Books, 1995, pp 21, 22, recommends spreading the lighter color into the darker color (at full strength), but when describing the determination of which color is lighter, suggests only that secondary colors are darker then the primaries they contain.

Specific models of the visibility of colored thin lines adjacent to colored backgrounds have not been noted, however there are models of the visibility of differences of color between two large colored backgrounds. A. R. Robertson, "Historical development of CIE recommended color difference equations", *Color Research and Applications,* 15, (3), June 1990 describes the origins of CIE L*a*b* and CIE L*u*v* color spaces. (CIE, refers to the Commission Internationale de l'Eclairage, an international standards committee specializing in color). These two spaces had the common goals of being simultaneously easy to compute, and perceptually uniform. Neither space is truly uniform throughout color space, but they have the merit of being readily computed. These two standard color spaces were adopted in 1976. In both of these color spaces L* is a correlate of lightness, while the other two coordinates give a way of specifying a color independent of its lightness. For example, in the L*a*b* system, larger values of a* indicate colors with more red in them while larger values of b* indicate colors with more yellow in them. Smaller values of a* indicate less red, or more green, while smaller values of b* indicate more blue (less yellow).

LAB color space, or CIELAB color space is based directly on CIE XYZ (1931) and represents an attempt to linearize the perceptibility of unit vector color differences. It is non-linear, and the conversions are reversible. Coloring information is relative to the color of the white point of the system, ($X_n$, $Y_n$, $Z_n$). The non-linear relationships for L* a* and b* are intended to mimic the logarithmic response of the eye.

$L^* = 116((Y/Y_n)^{\wedge}(1/3)) - 16$ for $Y/Y_n > 0.008856$ $L^* = 903.3(Y/Y_n)$ for $Y/Y_n <= 0.008856$ $a^* = 500(f(X/X_n) - f(Y/Y_n))$ $b^* = 200(f(Y/Y_n) - f(Z/Z_n))$ where $f(t) = t^{\wedge}(1/3)$ for $t > 0.008856$ $f(t) = 7.787 * t + 16/116$ for $t <= 0.008856$ Again, L* scales from 0 to 100.

To calculate the difference between two colors in either CIE L*a*b* or L*u*v space, one would normally use the Euclidean distance in the color space. For example, in L*a*b*, space one would calculate the difference between two colors as $\Delta E = (\Delta L^{*2} + \Delta a^{*2} + \Delta b^{*2})^{1/2}$. Here $\Delta L^*$ is the difference between the two colors in the L* coordinate, etc.

The CIE color space specifications also include definitions of hue and chroma, so that for the L*a*b* space, they define $h_{ab} = \arctan(b^*/a^*)$ and $C_{ab}^* = (a^{*2} + b^{*2})^{1/2}$. In this form, $\Delta C$ is the difference between the two chroma values, but $\Delta H_{ab} = (\Delta E_{ab}^{*2} - \Delta L^{*2} - \Delta C_{ab}^{*2})^{1/2}$ Because of the lack of true uniformity in these color spaces, further refinements have followed. Of particular interest is the CIE94 color difference model (CIE Publication 116-1995: Industrial color-difference evaluation (Technical Report) CIE Central Bureau, Vienna 1995). In this formula, $\Delta E94 = ((\Delta L^{*2}/k_L S_L)^2 + (\Delta C_{ab}^{*2}/k_C S_C)^2 + (\Delta H_{ab}^{*2}/k_H S_H)^2)^{1/2}$, with specific functions weighting each of lightness, chroma and hue differences. For the reference viewing conditions, all of the k parameters are kept at 1. They are free to change with changes in the viewing geometry, etc. The "S" functions were specified as $S_L = 1$; $S_C = 1 + 0.045 C^*_{ab}$, and $S_H = 1 + 0.015 C^*_{ab}$. Thus, the larger the chroma (i.e., the more colorful the colors being discriminated), the larger a change in hue or chroma people need before they can see that two colors are not the same. This color difference model provides a marked improvement over the Euclidean distance $\Delta E_{ab}^*$, but is only applicable for large regions obeying a specific geometry.

Due to the optics of the eye, the spacing of the receptors and the wiring of neural pathways leading to the brain, we can see fine detail best when it differs from the background in lightness. If there is no lightness variation, we can see detail better if it differs in redness (or greenness). Specifically, it is very hard to see fine detail in blue-yellow variation. Zhang and Wandell "A spatial extension of CIELab for digital color image reproduction", SID 96 describes a method of finding the visual difference between two images by first converting the images into an opponent color space, and then filtering the lightness channel, the red-green channel, and the blue-yellow channel each by different filters. The lightness is blurred least, and the blue-yellow channel the most, by these filters. In their paper, the resulting images are converted to CIEL*a*b* after blurring, and then the image difference is an image consisting of, at each pixel, $\Delta E_{ab}^*$, taken between corresponding pixels of the (filtered) two original images. Zhang and Wandell name this metric S-CIELab. An improvement over S-CIELab is to use the CIE94 color difference metric in the place of $\Delta E_{ab}^*$, otherwise leaving S-CIELab unchanged.

Note that one can compare any two images. In particular, if one wishes to know whether a line induced by misregistration would be visible, one could compare an image with the line to one without the line. If the pixel with the largest error in the difference image has an error above some threshold, the line is visible.

The above patents and references and particularly U.S. Pat. No. 5,313,570 to Dermer, et al. and U.S. Pat. No. 5,668,931 to Dermer are hereby incorporated by reference for their teachings.

SUMMARY OF THE INVENTION

In accordance with the invention, there is provided a method of generating a misregistration visibility metric and using the misregistration visibility metric to decide whether to trap, what trap color to use, and where to place the trap. From this metric, a trapping solution can be generated that will be least visible either when there is a gap filled in, or when there is no gap, and hence an overlap created by the trap.

In accordance with the invention, there is provided a printing system for printing colors with overlapped combinations of separately deposited separation colors, each separation color corresponding to a colorant, providing a trapping processor to vary the image to correct misregistration between colors due to imperfect placement of said separation colors, said trapping processor including: an input receiving signals representing sets of separation colors; a color conversion processor, converting separation colors to a new color space in which equivalent color differences in human color perception are approximately equivalent values; a visibility processor, determining for each color pair in said new color space, a visibility for any possible misregistration; and an image modification processor, suitable for altering a received image for trapping by said trapping processor.

In accordance with another aspect of the invention, the printing system as defined above further includes a trapping color selection processor determining a trap color that should be inserted into the image for trapping, responsive to said visibility processor determination.

In accordance with yet another aspect of the invention, the printing system defined above further includes a trapped color position determination processor, determining the position within the image at which the trap color should be placed.

In accordance with other aspects of the invention, the above defined system may optionally be limited to work at detected edges in an image. Additionally, since trapping is ultimately an inherent effect of any particular printing technology, the printer technology may be taken into account in generating trapping decisions.

In accordance with another aspect of the invention, information about the printing technology, or even regarding a particular printer, may be used to optimize the trapping process.

These and other aspects of the invention will become apparent from the following description used to illustrate a preferred embodiment of the invention in conjunction with the accompanying drawings in which:

DESCRIPTION OF THE DRAWINGS

The present invention provides an efficiently calculated trapping method, which may be easily altered based on device or user experience. The method also allows ready alteration of the trapping process due to new material or process parameters.

DESCRIPTION OF THE INVENTION

Figure 1A:
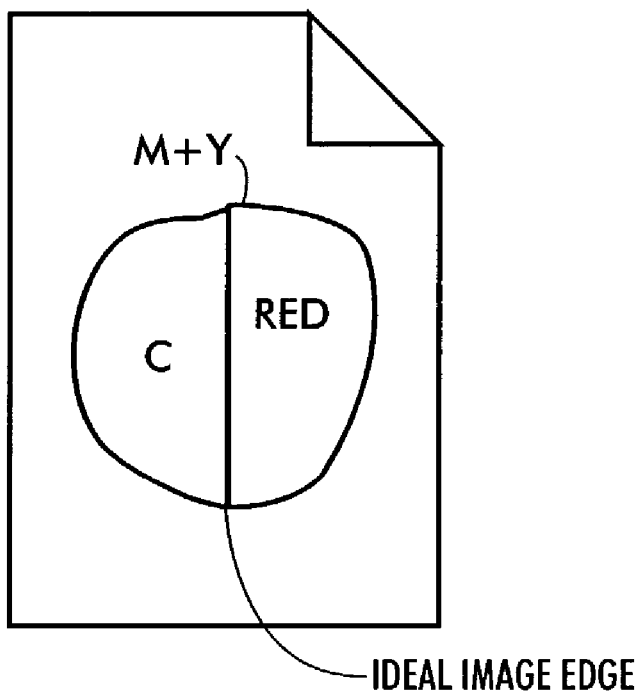
FIGS. 1A and 1B illustrate the problems of misregistration at edges in color images.

Referring now to the drawings where the showings are for the purpose of describing an embodiment of the invention and not for limiting same, a basic image processing system is shown in FIG. 1, where gray image data may be characterized as image signals, each pixel of which is defined at a single level or optical density in a set of 'c' optical density levels.

As used herein, a "pixel" refers to an image signal associated with a particular position in an image, having a density between a minimum and a maximum. Accordingly, intensity and position define pixels. In the particular color system to be discussed, color documents are represented by multiple sets of image signals, each set (or separation) represented by an independent channel, which is usually processed independently. A "color image" as used herein is therefore a document including at least two separations, or sometimes more than 4 separations (sometimes referred to as "hifi color". Each separation provides a set of image signals or separation pixels, which will drive a printer to produce one color separation of the image. In the case of multicolor printers, the separations, superposed together, form the color image. In this context, we will describe pixels as discrete image signals, which represent optical density of the document image in a given small area thereof. The term "separation pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals, which vary between maximum and minimum, irrespective of the color of the separation in which the signals are used. Documents may include plural "objects". An object is a discrete image element, which may be processed distinctly from the remainder of the document. Objects commonly fall into types, including, for example, photographs, graphics, text, halftones, etc. High quality systems process objects of different types distinctly, for optimum rendition of each type.

Figure 3:
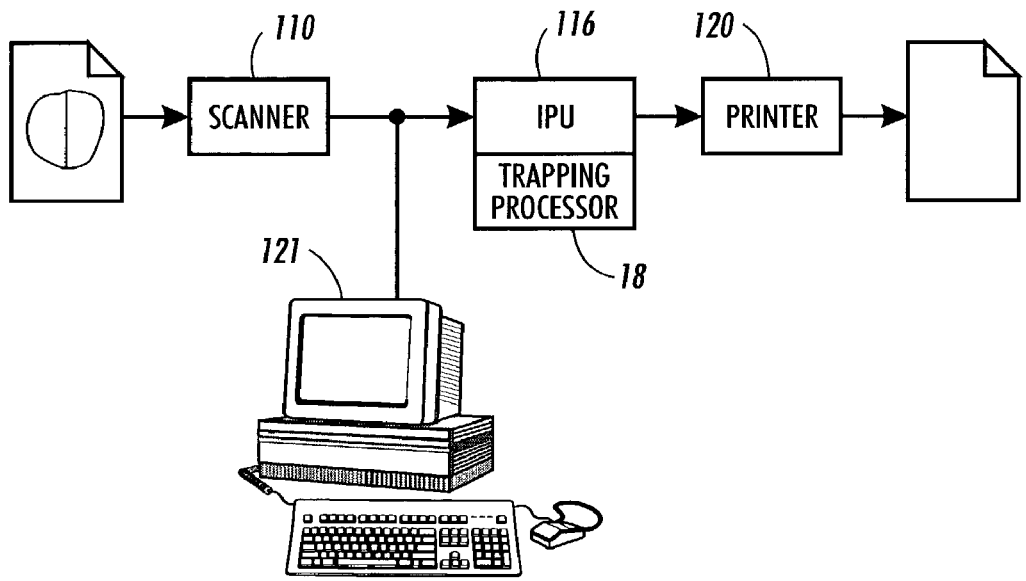
FIG. 3 shows a printing system, in which one example of the present invention might be implemented.

Refer now to FIG. 3, which shows a general system requirement representative of the invention. An electronic representation of a document (hereinafter, an image) from image input terminal such as scanner 10 is derived in a format related to the physical characteristics of the device, and commonly with pixels defined at m bits per pixel. Common color scanners have a pixel depth of 8 bits/separation pixel, at resolutions acceptable for many purposes. Alternatively, the image could be generated with appropriate image generation software at a computer or workstation 121. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Of course, the IPU 16 could represent a software program in a general purpose digital computer. For the purposes of this discussion, image processing unit 16 commonly includes a trapping processor 18 which corrects for traps formed at color edges.

Figure 1B:
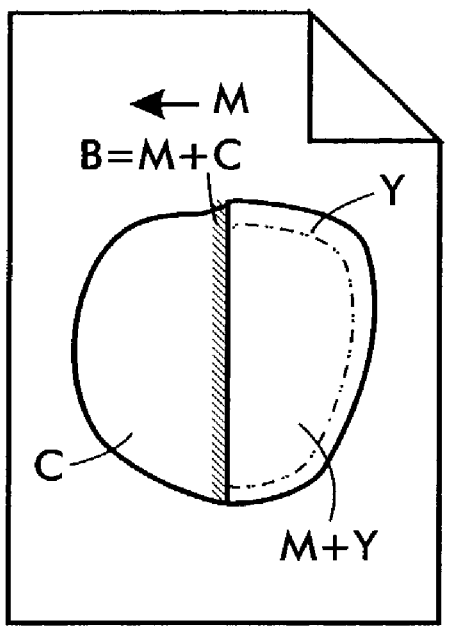

FIGS. 1A and 1B illustrate with generality the problem of trapping. In an ideal image, changes in colors occur exactly at a preplanned location, as shown in FIG. 1A. However, misregistration, common in real world devices using plural separations independently printed, often results in a visible image artifact or defect, as shown in FIG. 1B. Such defects can be compensated with trapping.

Figure 2:
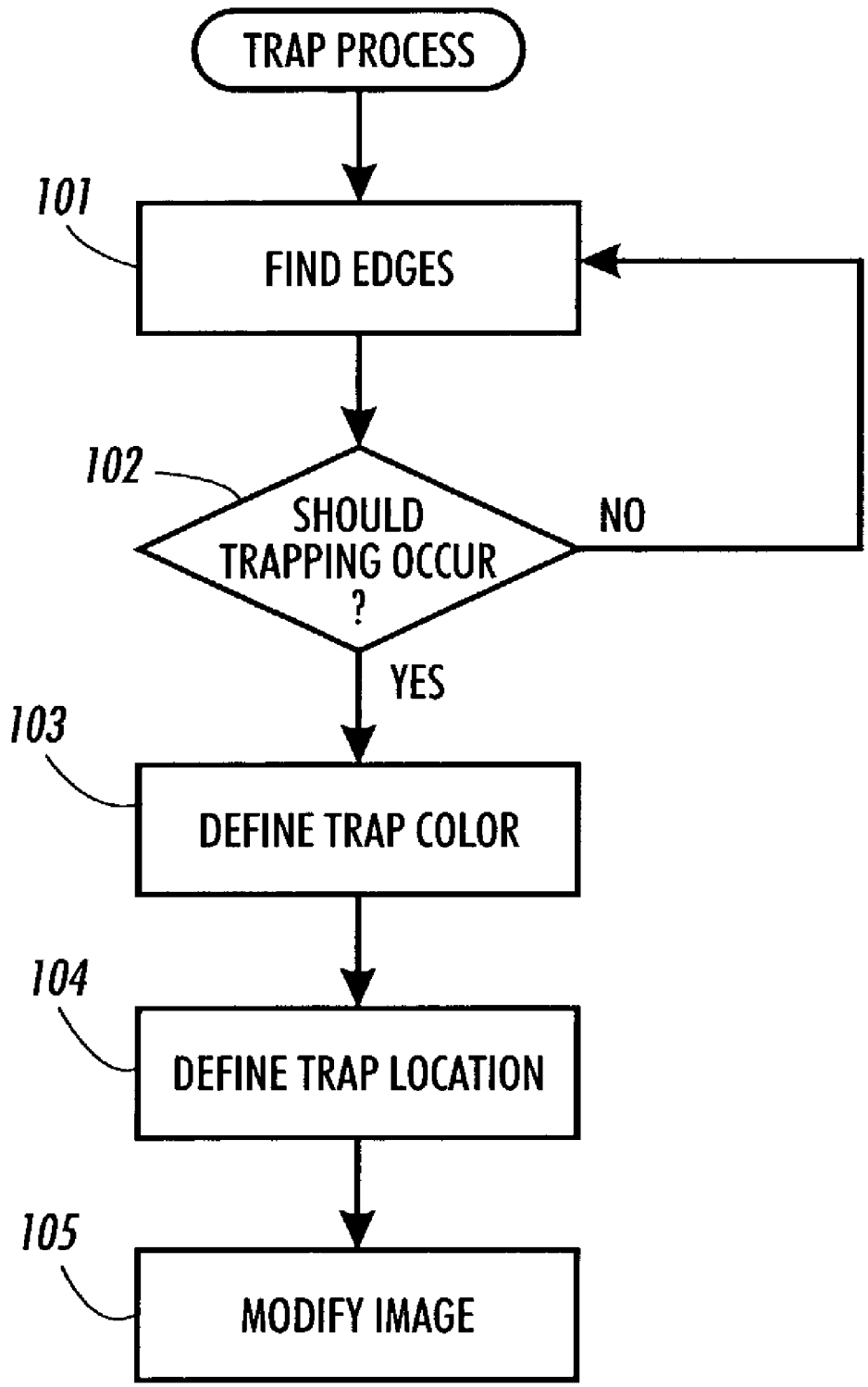
FIG. 2 shows a flow chart showing the basic procedure of trapping.

Trapping usually takes place in accordance with the showing of FIG. 2, in which, a) for any pair of colors (which may or may not correspond to an edge), a decision must be made b1) whether to trap; if so, b2) which color to use for the "trap color", (the color to interpose between the colors of the pair) and b3) where to place the chosen trap color. In accordance with the invention, the decision to trap is based on the visibility of the worst artifact that could happen. Thus, the decision to trap is based on the visibility of the worst of all possible misregistration errors between the input colors. Subsequently, trap colors are chosen based on the visibility of the added trap color against each of the original colors, and based on the visibility of misregistration-induced colors against each of the original colors.

As has been discussed, trapping is a phenomenon of non-ideal printing devices. Trapping characteristics vary from printing technology to printing technology.

Initially, the process of the invention will be described with reference to the flow chart of FIG. 3. Such a flow chart is readily convertible to a program running on a general purpose digital computer, or a special purpose processor built to provide such operation.

Given a pair of colors (a, b) to be trapped (step 100), the trapping process takes the following form:
1. Check for visibility of potential misregistrations (step 202);
2. Determine whether any misregistration will be visible (step 204);
3. If a misregistration is likely to be visible, choose the color to insert (step 206); and
4. Decide where to put the trap (step 208).

In considering step 202, and input colors (a,b), a list (Misregister (a,b)) is produced of all the unique colors that would appear between colors a and b, if a and b are misregistered in all possible ways. The assumption is that the worst case is that one or more of the separations is moved all the way from its nominal location to the edge of a specification, determined empirically by the printing process (See, FIGS. 1A and 1B). An alternative assumption would allow some separations to move only part way, thereby inducing more colors along the edge. We consider the case of one color along the edge.

A function Misregister(a,b) runs through all possible substitutions of a separation in a with a separation in b. There are, at most, 14 such substitutions. (Each of four separations is either substituted or not—but two cases, "all" or "none" substituted, do not require processing). Table 1 shows the colors that could appear on the left of an edge between the CMYK color (1,1,1,1) on the right with (0,0,0,0) on its left. Two of those colors are the original colors, leaving 14 possible new colors.

TABLE 1

| # | Cyan | Magenta | Yellow | Black | Colors shifted left |
|---|------|---------|--------|-------|---------------------|
| 1 | 0 | 0 | 0 | 0 | none |
| 2 | 0 | 0 | 0 | 1 | black |
| 3 | 0 | 0 | 1 | 0 | yellow |
| 4 | 0 | 0 | 1 | 1 | yellow, black |
| 5 | 0 | 1 | 0 | 0 | magenta |
| 6 | 0 | 1 | 0 | 1 | magenta, black |
| 7 | 0 | 1 | 1 | 0 | magenta, yellow |
| 8 | 0 | 1 | 1 | 1 | magenta, yellow, black |
| 9 | 1 | 0 | 0 | 0 | cyan |
| 10 | 1 | 0 | 0 | 1 | cyan, black |
| 11 | 1 | 0 | 1 | 0 | cyan, yellow |
| 12 | 1 | 0 | 1 | 1 | cyan, yellow, black |
| 13 | 1 | 1 | 0 | 0 | cyan, magenta |
| 14 | 1 | 1 | 0 | 1 | cyan, magenta, black |
| 15 | 1 | 1 | 1 | 0 | cyan, magenta, yellow |
| 16 | 1 | 1 | 1 | 1 | all |

These 14 colors are sorted according to an arbitrary sort order, considering two separations equal if they differ by less than a small tolerance. Then duplicates are removed. Finally, two more cases (if they occur) are removed: substitutions where one of the original colors results, which happens at least once whenever one or more separations is in common. This gives a (usually) smaller list, which is stored in a structure containing a 14 element array and a single integer giving the number of colors in the list. For purposes of discussion, we call the type of this structure CMYKvector (step 252). Colors are given as c, m, y, k tuples, encapsulated as a signal or set of signals of type CMYKcolor.

The determined colors are then converted to LAB space (step 254). LABvector, is a signal or set of signals representing the possible misregistration colors in LAB space. LABvector is constructed from CMYKvector using device dependent color conversion, a process which entails a prior generation of samples of CMYKcolors, organized into a table, and mapped to LAB space, either directly or through an intermediate space. Before the first LABcolor is constructed, the necessary lookup tables are initialized as appropriate to the particular printer for which the colors are being converted. Since such a process is dependent on discrete sample points in CMYK and LAB space, intermediate, interpolated values can be derived by tetrahedral interpolation (see, for example, U.S. Pat. No. 5,471,324 to Rolleston and U.S. Pat. No. 4,725,413 to Sakamoto). Any color calibration system begins by measuring the LAB colors generated when a variety of CMYK colors are printed. These colors are interpolated to get the LAB color for the given CMYK color. Because the conversion is specific to the printer or type of printer, the visibility computed depends on the printer as well, as it should, since a particular amount of (C,M,Y,K) printed on one printer will not necessarily produce the same visual impression as the same amounts of colorants printed on a different printer. Many printing systems are calibrated, so that for a given device independent color, a predetermined device dependent color is produced, derived from a prior calibration process in which the device operation was measured to determine its response. If the trapping process is to be used on an uncalibrated printing system, the conversion of device independent and device dependent values must still be determined.

The reason for placing the colors into CIELAB space, or a similar space CIELUV, is that these spaces have a strong connection to visually perceptible color differences, which allow them to be used to determine, irrespective of the misregistration color, whether that color is likely to be visually perceptible. At the heart of this requirement is the observation that misregistered separations can result in color differences from the desired image, with the differences not plainly visible. Changes should only be made where the color differences due to misregistration are visible. Differences observed in CIELAB or CIELUV have a relationship to visibility in human color perception. This visibility is usable as a metric for how apparent a trap or trap modification can be.

Figure 5:
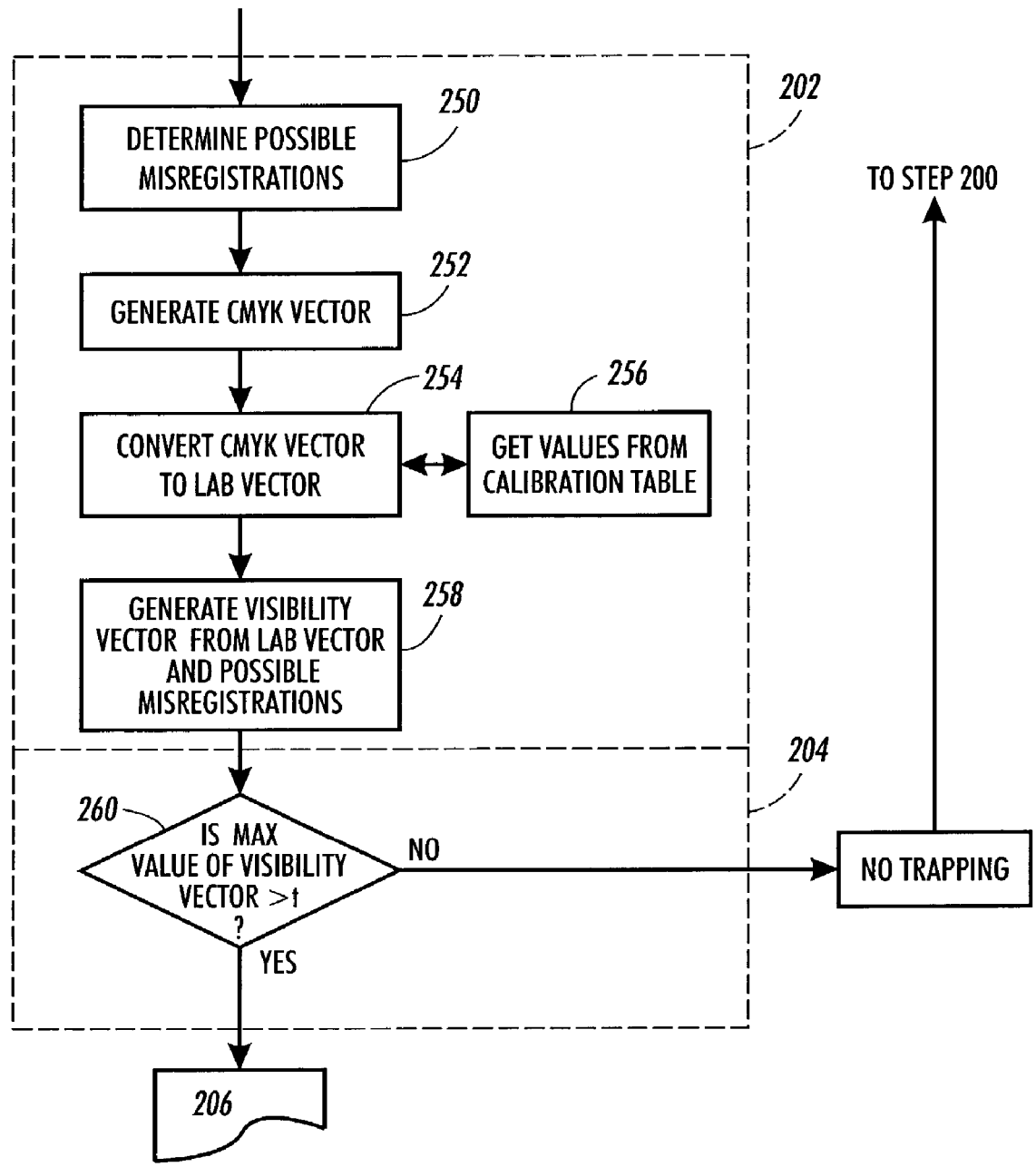
FIG. 5 shows a flow chart illustrating a sub-procedure of determining visibility.

Accordingly, at step 204, where we determine whether misregistration is visible, the color space aids in our calculation, because perceptible differences are relatively linear. With reference to FIG. 5, initially, a Visibilityvector (a,b) is constructed (step 258), and tested to see whether the max value of the vector is greater than a threshold (step 260). The color difference formula is designed to give a value 1 at the limit of visibility, hence one good value of the threshold is 1.

One color difference formula that works well is derived from the CIE94 difference formula, and based on experimental data of the visibility of thin lines against a uniform colored background, viz.

$$DE94=((\Delta L/1.34)^2+(\Delta C_{ab}/S_C)^2+(\Delta H_{ab}/S_H)^2)^{1/2}$$

with $$S_C=(a_c C^*+k_c)(1+b_C(A0_C \cos(H^*-f0_C)+A1_C \cos(2H^*-f1_C))),$$

and $$S_H=(a_H C^*+k_H)(1+b_H(A0_H \cos(H^*-f0_H)+A1_H \cos(2H^*-f1_H))).$$

| | C | H |
|---|---|---|
| a | .085 | .008 |
| k | 6.3 | 6.5 |
| b | .08 | .004 |
| A0 | 4 | 7.3 |
| A1 | 3.3 | 5.3 |
| f0 | 958 | 848 |
| f1 | 2408 | 108 |

H* and C*, where needed, are computed from the large color, not the one computed from misregistration. The difference between two colors is asymmetric.

A different metric, which appears to work nearly as well, is to compute images with and without the defect, and then use these images as input to S-CIELab with the CIE94 difference metric replacing the $\Delta E_{ab}$ normally used to compute the final difference. The largest pixelwise difference in the entire difference image then gives the difference for this formulation.

In order to construct a Visibilityvector as in FIG. 5, each of the input colors a and b is converted to an L*a*b* equivalent. In order to construct an LAB color, given a CMYK color, we need to employ tetrahedral interpolation, or some other commonly known method of converting from device coordinates to device dependent color space. The process then loops through each of the elements (the possible misregistrations) of the LABvector, and computes the difference from a and from b for that element. It stores the minimum of these two differences. The minimum is the right one to store, because if c (the misregistration induced color) is less visible against a than against b, and c is between a and b, we might see c as part of a. This is certainly true if c is invisible against a but visible against b. It then appears that the edge between a and b is shifted, rather than that there is a misregistration error. As previously noted, the above values are often present in calibrated printers, and can therefore be used in trapping processing.

At step 258, a Visibilityvector is constructed from two colors (a, b) and the list of misregistration colors, and a list of values is built which correspond to the visibilities of all the misregistration colors. If the maximum entry in the Visibilityvector is less than a threshold value t (FIGS. 4 and 5, step 204), the misregistration will not be visible. No action is taken at these two colors, and the next set of two colors is reviewed. However, if the maximum is greater than a threshold value t, the process continues to select a color for the trap (step 206). If the value of t is increased, fewer color pairs will be selected for trapping, and the process of checking for misregistration will proceed faster. However, image quality will be reduced. On the other hand, decreasing the value of t will result in more color pairs selected for trapping, and the process of checking will proceed slower. Generally image quality will be enhanced.

Figure 4:
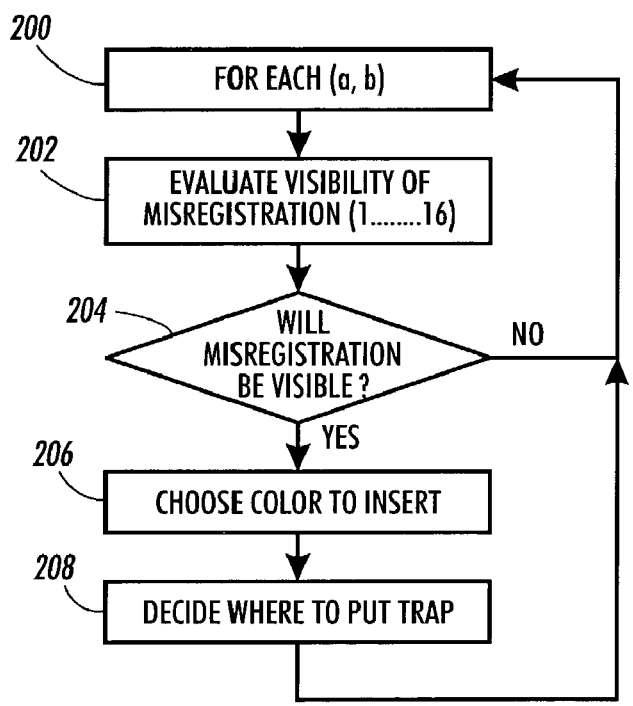
FIG. 4 shows a flow chart showing a procedure for trapping using visibility as a criteria for controlling trapping processes.
Figure 6:
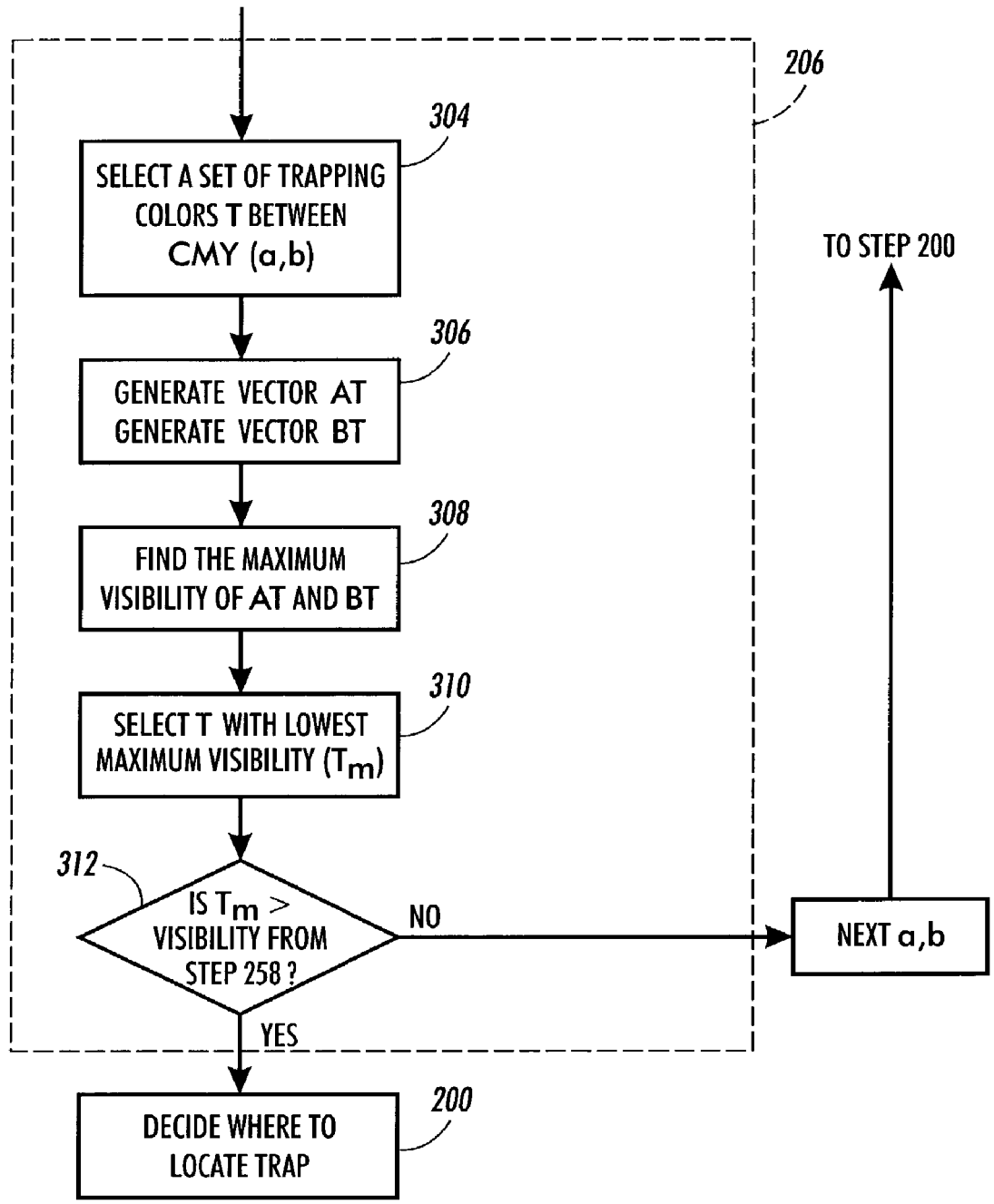
FIG. 6 shows a flow chart illustrating a sub-procedure of selecting trapping colors.

With reference to FIGS. 4 and 6, at step 206, the trapping color is selected or determined. Generally, a predetermined set of trapping colors is maintained as a palette, with selection throughout the gamut of a device (see "select a set of trapping colors CMYK(t)", step 300). User preferences can be used to generate the palette.

To choose the color to insert between a and b, every color T in the palette is compared to colors CMYK(a, b) (step 302) to see if T is between a, b (Step 304). Color T is not "between" if any of the values of C, M and Y for T are not between those for a and b (K may be ignored). Such colors not between a,b are discarded. For each T for which C, M and Y are between a,b, a Trap_Visibilityvector AT is generated for a and T, and a Trap_Visibilityvector BT is generated for b and T. (Step 306). From the two Trap_Visibilityvectors, maximum visibility $t_m$ in AT and BT are determined (step 308). This gives the visibility of T against a or b, assuming the worst misregistration happens for one or the other of a and b. Of all the candidate colors T tried in the above loop, the one with the lowest maximum visibility $T_m$ is selected as representing the best trapping color candidate (Step 310).

At this point in the process, a check is performed to determine if the visibility of the candidate color is worse than the initial misregistration visibility found in step 258 of FIG. 5 (step 312). If it is, no trapping is applied. Otherwise, however, the process proceeds to step 208, using the candidate color T whose worst visibility is the best of all the candidate colors tried. It has also been found that a good alternative to using the color with the least worst visibility, is taking the sum of the squares of the visibilities over all misregistrations and choosing the candidate with the smallest sum. In either case, the different visibilities might be weighted, given a priori knowledge of which misregistrations are more likely to occur.

Other approaches are possible, e.g. a multigrid approach in which color space is sampled very coarsely, and then the region of the best solution is sampled more finely.

Trap_Visibilityvector is a class that behaves much like Visibilityvector. From two colors and a vector of misregistration colors a vector is built which correspond to the visibilities of all the misregistration colors. In the case of Trap_Visibilityvector the first color is the original color and the second color is the candidate trap color. The vector of misregistration doubles is one longer than the vector of misregistration colors. The visibilities are measured only between the original color and the misregistration colors, and between the original color and the candidate trap color, not between the candidate trap color and the misregistration colors. The use of this value is analogous to Visibilityvector, except that the second color is not compared against the misregistration colors, and the second color is compared against the first color.

With reference again to FIG. 5, now that the color of the trap has been selected, a decision must be made as to where to put it (step 208, FIG. 4). When trapping, we interpose a new color between two colors that might misregister, thereby reducing or eliminating the visibility of any misregistration that should occur. This aspect of the invention relates to the location of the interposed color (trap). Specifically, the new color is put on one side of the original edge when the trap color is not very visible against the color on that side of the edge, and on the other side when it is not very visible against the color on the other side. When it is equally visible, the trap color is centered. By making the edge position a function of the difference between the two visibilities, we make the position smoothly vary from one side to the other when gradient fills abut. If the one color is in text, the position is not varied smoothly, but rather moved all the way over to one side or the other (whichever is less visible), to maintain the edge location of the text.

Figure 7:
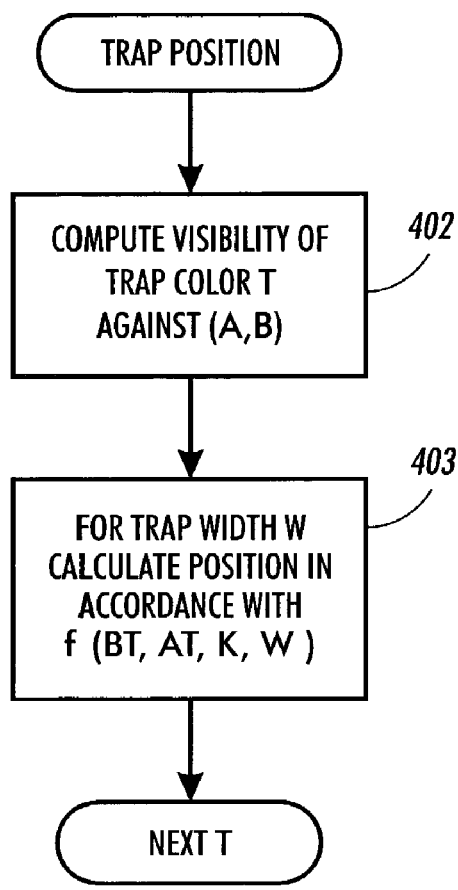
FIG. 7 shows a flow chart illustrating the basic sub-procedure of selecting the position for the trap.
Figure 8:
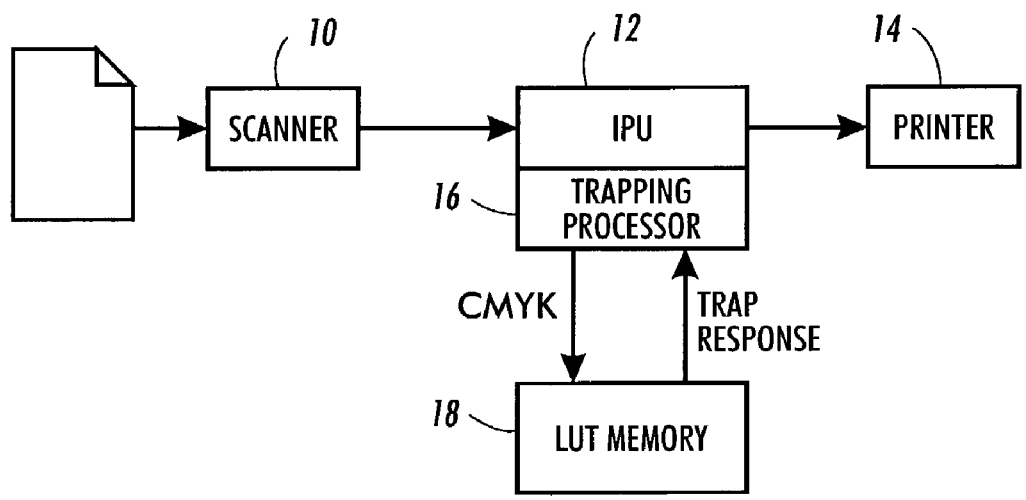
FIG. 8 shows the problem of placement of the trap color.

Given the above, and with reference to FIGS. 7 and 8, the optimum place to put the trap color is on which ever side makes it less visible. Specifically, if trapping between color A and color B with trap color T, compute visibility by determining the Visibilityvector AT of T against A, and Visibilityvector BT of T against B (step 402). The vectors are initially converted to scalar values by taking a vector norm to drive bt and at. For trap width w, if A is to the left, move the center of the trap region to the left by (BT−AT) *k*w, for some value of k that depends on the particular model of visibility being used, subject to not moving it more than ±w/2 (Step 402). Other functions relating the relative visibility of T against colors A, B may be used. Half-bitting allows the trap zone to move in increments of ½ of a pixel, so for a trap width of 2 pixels, this allows 5 positions. Thus, a smoothly varying trap position can be obtained.

The visibility can be computed using S-CIELab-94, a spatially extended color difference metric, extended to use CIE94 color differencing, or from any other model of visibility that applies to thin lines against large background constant background regions. Currently visibility is measured by:

$$Vis(A, T) = ((\Delta L/S_L)^2 + (\Delta C/S_C)^2 + (\Delta H/S_H)2)^{1/2}$$

where $\Delta L = L_A - L_T$, the difference between the L* values of A and T;

$\Delta C = C_A - C_T$, the difference between the C* values of A and T;

$C^* = (a^{*2} + b^{*2})^{1/2}$, with a* and b* the standard CIE coordinates.

$$\Delta H = ((\Delta a)^2 + (\Delta b)^2 - (\Delta C)^2)^{1/2}$$

$S_H$, and $S_C$ are functions only of $C_A$ and $H_A$, linear in $C_A$, and periodic in $H_A$; and $S_L$ is a constant In some situations, the added trap color will be placed side by side with the misregistration-caused colors. Generally, there is little concern with the visibility of misregistration-induced colors against the trap color because this will be two very thin lines against each other, and it will be harder to see than one of the lines against a solid, which we assume the pair color to be.

It will sometimes be the case that, due to the printer technology used, the required trapping is anamorphic (that is, its behavior in one dimension is different from that in another) in nature. For example, It could be the case that a trap region required is twice as large in one direction, as in the other, because of the printing process direction. In such a case, the trapping positional values can be scaled independently in each direction. Thus, in a vector-based technique, all of the coordinates in the geometric description would be scaled by a factor (e.g. 2) in one dimension before trapping regions are calculated, and then all coordinates (including those of trapping regions) would be scaled down by the same factor, restoring the original geometry, but making trap regions that are thicker in one dimension than the other.

Alternatively, an edge following process may be used with raster input, in which an edge following function is used. Here, the standard practice is that the offset edge is displaced a constant distance along the vector normal (perpendicular) to the edge being followed. A coordinate transformation can be applied to the offset edge (in the example of trapping twice as wide in x, scale the normal by 2 in x). This will cause the offset edge to be displaced further from vertical edges than from horizontal edges, with a smooth variation in between.

Finally, a windowing process might be used, or a morphological operator, with a window and its associated filters of morphological operator being appropriately scaled.

Another possible embodiment of the invention is in a lookup table (LUT) accessible by a computing device, either general or special purpose. In accordance with another aspect of the invention, FIG. 8 illustrates a system similar to the one shown in FIG. 3, but better illustrating the possibility that IPU relies on a LUT storing trapping parameters. The goal with this method is to construct a table which, given colors A and B in CMYK space will produce a Boolean flag, and if the flag is true, a new color to be drawn between A and B. The flag will be false if the colors, when misregistered, will produce no visible artifact, e.g. (0,0,0,0) against anything; or there is no way of reducing the visibility of the artifact by interposing a third color.

As above, initially, the visibility of potential misregistrations is checked, as in FIG. 4, step 202:

1) Apply the method above to determine whether to trap. If the decision is not to trap,
   2) Set a Boolean flag to FALSE
3) Else
   4) Go on to choose the color to insert between a, b Choosing the color to insert between a and b, as in FIG. 4, step 206:

1. Apply the method above to find a trap color.
2. If the visibility of the selected trap color is worse than the initial misregistration visibility found earlier,
   3. Set the flag to FALSE.
4. Otherwise
   5. Set the flag to TRUE.
6. Store the difference between the color to insert and color A in the table.

To build a complete table, the first set of steps (visibility of misregistration) must be done for every pair of colors in color space. Half the color pairs are the mirror image of the other half, so it really only needs to be done for half of color space. If color space is quantized into n points, this is 1. STEP=1/n
2. HALFSTEP=STEP/2
3. STEPY=1/ny
4. HALFSTEPY=(STEPY)/2
5. for ac=HALFSTEP to 1-HALFSTEP by STEP
   6. for bc=HALFSTEP to 1-HALFSTEP by STEP
      7. for am=HALFSTEP to 1-HALFSTEP by STEP -continued 8. for bm=HALFSTEP to 1-HALFSTEP by STEP
   9. for ay=HALFSTEPY to 1-HALFSTEPY by STEPY
      10. for by=HALFSTEPY to 1-HALFSTEPY by STEPY
         11. for ak=HALFSTEP to 1-HALFSTEP by STEP
            12. for bk= ak to 1-HALFSTEP by STEP
               13. check the visibility for (a,b)
               14. if worst case visible
               15. choose the color to insert
               16. Store the difference between the color to insert and color A in the table.

Conveniently, this table can be built off-line. In a table-based approach all that is done at run time is indexing the table. Table indexing is performed as follows:

Given colors A and B, both in CMYK
1) Convert the separations of A and B to index space by multiplying them by a scale factor that puts them in the range 0.MAXINDEX.
2) Use the converted separations in an eight dimensional table lookup to find the color difference stored in the table.
3) Add the difference to color A giving the trap color.

If the value of MAXINDEX is one less than a power of two, and the colors are supplied as tuples of integers, this can be optimized using shifts and masks.

As always, there is a space-time tradeoff in indexing the table. If space is at a premium, one might consider interpolating between table entries, provided the entries vary sufficiently smoothly. This will increase the time required to find trapping information, but can reduce the table size substantially. For example, since the table is eight-dimensional, reducing the size by 20% in each dimension will reduce the size of the table to about 17% of its original size. Reducing the size by a factor of two in each dimension will reduce the total size by a factor of 256.

Of course, some practical optimizations are possible. The generation of class VisibilityVector is a relatively complex process as described. It needs to convert its two given colors to a useful color space such as CIELAB, and also all the misregistered colors. It must also find the C* and H* coordinates for every color it converts. The number of times through the inner loop (steps 13–16) is the same as the number of color pairs for which the trapping information is computed. Thus there are tens of thousands to millions of color pairs. Each color pair needs to have both of its elements converted, and then all of its misregistration colors converted, before starting on step 15. However, for n=8, and ny=4, there are only 8³*4=2048 colors involved in all of these color pairs. This includes the colors generated by misregistrations. Assuming 4 unique colors generated by misregistering the average color pair, there are 14 million redundant color conversions done. Alternatively, a simple table lookup (4 dimensional) can get the misregistration colors converted, including to C* and H*. For the regular colors, if the table is generated in the order they are needed, a 1 dimensional lookup (i.e. pointer increment) will fetch the right color.

A similar optimization is available for the trap colors, but assuming the grid for them is different from the grid for color pairs, they will need their own table, again one-dimensional. If the trap colors are restricted to having their color components bounded by the color components of the color pair, then the grid for the trap colors must either be a multiple of the grid for the color pairs, or the process must find the nearest grid point for the conversion. A 16×16×16×16 table will prove acceptable.

A secondary table may be easily formed, using data from the primary table, storing frequently or recently used color pair trapping information. Smaller tables are faster to check than the larger tables. A table would also provide an excellent location for storing user specified values for selected trapping situations. The position of the trap color between 2 colors can be put into the table as well.

Figure 9:
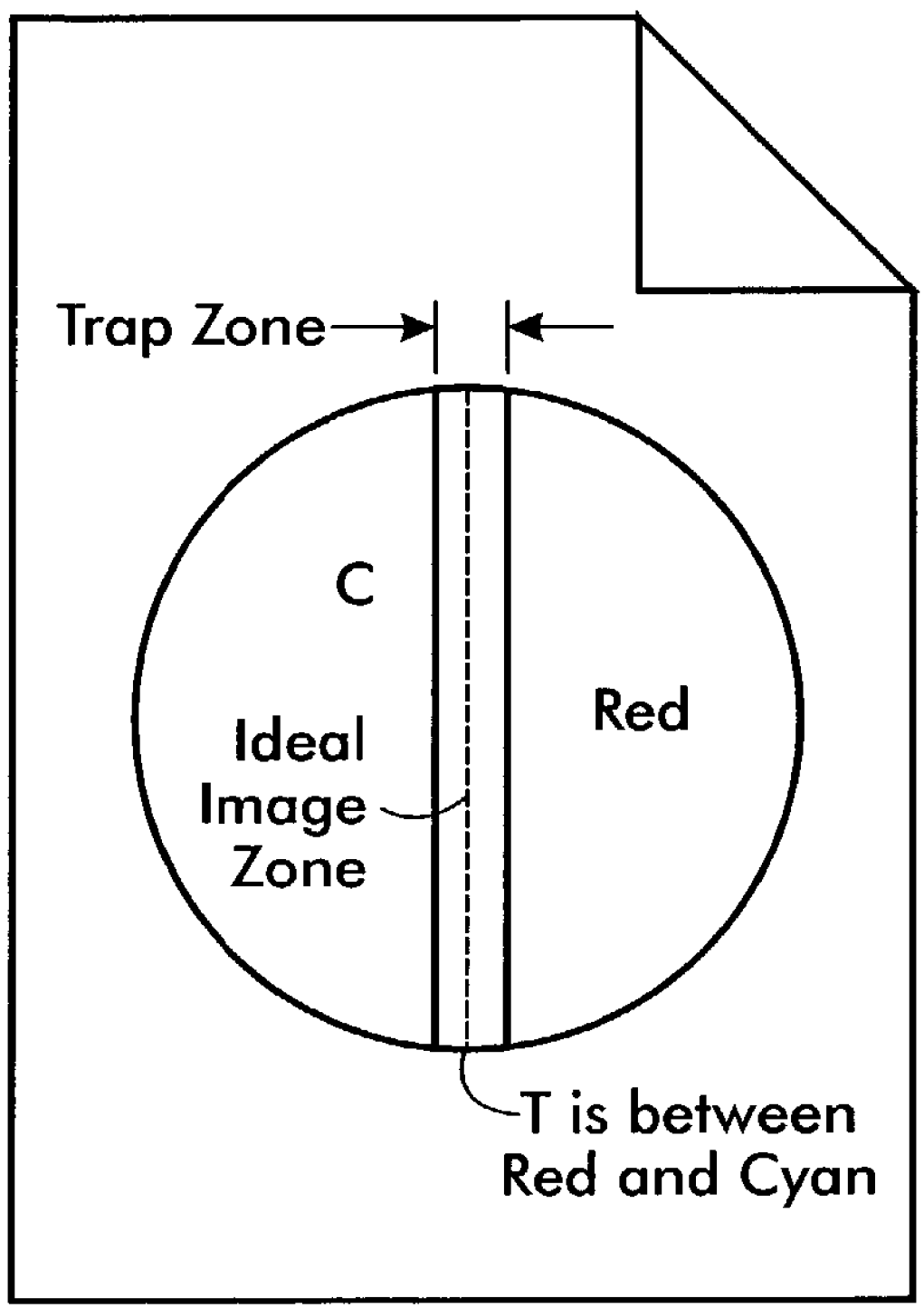
FIG. 9 shows an embodiment of the invention utilizing a lookup table storing trapping information.

FIG. 9 is a simplified illustration of the results of trapping. Now the trap zone, between the cyan and red areas of the image, is characterized by having the trap color, selected to be between cyan and red. Of course, we placed the trap color pixels on one side or the other of the ideal edge, in accordance with the process of FIG. 7.

It will no doubt be appreciated that several trapping processes have been described, each of which may be used together or independently of the other disclosed processes, should one choose to generate visibility criteria as part of the trapping process. Thus, for example the trapping position or location process described can be used irrespective of the particular trapping determination step, although it would be preferable to use it in a visibility based system, simply because the visibility criteria have already been calculated.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

The invention claimed is:

1. A printing system for printing colors with overlapped combinations of separately deposited separation colors, each separation color corresponding to a colorant, providing a trapping processor to vary the image to correct misregistration between colors due to imperfect placement of the separation colors, comprising:

an input to receive signals representing sets of separation colors;

a color conversion processor to convert-separation colors to a new color space in which equivalent color differences in human color perception are approximately equivalent values;

a visibility processor to determine for each color pair in said new color space, a visibility value for any possible misregistration, said visibility value being determined using non-luminescence values of each color pair; and an image modification processor to alter a received image based on said visibility value.

2. The printing system as claimed in claim 1, further comprising:

a trapping color selection processor to determine a trap color that should be inserted into the image for trapping, based upon the determined visibility value.

3. The printing system as claimed in claim 1, further comprising:

a trapped color position determination processor, determining the position within the image at which the trap color should be placed.

4. The printing system as claimed in claim 1, wherein said new color space is CELAB.

5. The printing system as claimed in claim 1, wherein said new color space is CIELUV.

6. The printing system as claimed in claim 1, wherein said visibility processor determines all possible misregistration combinations for a color pair at an edge as an initial process.

7. The printing system as claimed in claim 6, wherein said visibility processor determines, for each color pair, the visibility value of each misregistration as a measurement of color difference between each non-luminescence value of said color pair and each misregistration in said new color space.

8. The printing system as claimed in claim 1, further comprising:

a trapping color selection processor determining which trap color from a set of preselected trap colors should be inserted into the image for trapping, responsive to said visibility processor determination.

9. The printing system as claimed in claim 8, wherein said trapping color selection processor determines which trap colors of said preselected set thereof should be used for trapping based on the visibility values of said colors as a measurement of color difference therebetween of the non-luminescence values.

10. A method for printing colors with overlapped combinations of separately deposited separation colors, each separation color corresponding to a colorant, and providing a trapping processor to vary an image formed thereby to correct misregistration between colors due to imperfect placement of the separation colors, the comprising:

(a) receiving color signals representing sets of separations colors, for printing;

(b) converting the color signals to a color space in which equivalent color differences in human color perception are equivalent values;

(c) determining, for adjacent ones of the color signals in the image in the new color space, a visibility value for each possible misregistration, the visibility value being determined using non-luminescence values of each adjacent ones of the color signals; and (d) modifying the image, responsive to the determination of visibility value of each potential misregistration.

11. The method as claimed in claim 10, further comprising:

(e) determining a trap color to be inserted into the image for trapping.

12. The method as claimed in claim 11, wherein determining a trap color includes selecting a trap color between colors of the adjacent ones.

13. The method as claimed in claim 11, wherein the trap color determination selects a trap color from a preselected set thereof.

14. The method as claimed in claim 10, further comprising:

(e) determining a position within the image at which a trapping modification should be placed.

15. The method as claimed in claim 14, wherein determining a trap modification position includes using the determined visibility value to evaluate positioning of any added trap color.

16. The method as claimed in claim 14, wherein determining a trap modification position includes continuously adjusting the determined trap modification position in accordance with variations in the visibility value relative to a reference value.

17. The method as claimed in claim 14, wherein determining a trap modification position includes placing the trap modification position on one side or the other of an image edge at adjacent ones of the color signals in the image.

18. The method as claimed in claim 14, wherein determining a trap modification position includes continuously adjusting the determined trap modification position in accordance with variation of any object types within the image.

19. The method as claimed in claim 10, wherein the new color space is CIELAB.

20. The method as claimed in claim 10, wherein the new color space is CIELUV.

21. The method as claimed in claim 10, wherein for adjacent ones of the color signals, a misregistration determination determines all possible misregistration combinations for a color pair as an initial process.

22. The method as claimed in claim 21, wherein misregistration determination for adjacent ones of the color signals of the visibility values for each potential misregistration includes measurement of color difference between each color of the color pair, and each misregistration, in the color space.

23. The method as claimed in claim 10, wherein determining a trap color to be inserted into the image for trapping includes:
 providing a set of trap colors to be used;
 determining a visibility value for each trap color; and
 determining a member of the set of trap colors that should be used for trapping based on the visibility value of the trap color against the adjacent ones of the color signals.

24. The method as claimed in claim 10, wherein determining a trap color includes misregistering a combination of the original colors with the trap color prior to determining visibility values.

25. The method as claimed in claim 10, wherein any calculated visibility value is weighted by the probability of the corresponding misregistration occurring prior to modification of the image.

26. A method for printing colors with overlapped combinations of separately deposited separation colors, using a selected printing technology with known misregistration behavior, each separation color corresponding to a colorant, and providing a trapping processor to vary an image formed thereby to correct misregistration between colors due to imperfect placement of the separation colors, the method comprising:
 (a) receiving color signals representing sets of separations colors, for printing;
 (b) converting the color signals to a color space in which equivalent color differences in human color perception are equivalent values;
 (c) determining, using information regarding the printing technology, for adjacent ones of the color signals in the image in the new color space, a visibility value for each possible misregistration, the visibility value being determined using non-luminescence values of each adjacent ones of the color signals; and
 (d) modifying the image, responsive to the determination of visibility value of each potential misregistration.

27. The method as claimed in claim 26, further comprising:
 (e) determining a trap color to be inserted into the image for trapping.

28. The method as claimed in claim 27, wherein determining a trap color includes selecting a trap color between colors of the adjacent ones.

29. The method as claimed in claim 27, wherein trap color determination selects a trap color from a preselected set thereof.

30. The method as claimed in claim 26, further comprising:
 (e) determining, using printing technology information, a position within the image at which a trapping modification should be placed.

31. The method as claimed in claim 30, wherein determining a trap modification position includes using the determined visibility value to evaluate positioning of any added trap color.

32. The method as claimed in claim 30, wherein determining a trap modification position includes continuously adjusting the determined trap modification position in accordance with variations in the visibility value relative to a reference value.

33. The method as claimed in claim 30, wherein determining a trap modification position includes placing the trap modification position on one side or the other of an image edge at adjacent ones of the color signals in the image.

34. The method as claimed in claim 30, wherein determining a trap modification position includes continuously adjusting the determined trap modification position in accordance with variation of any object types within the image.

35. The method as claimed in claim 26, wherein the new color space is CIELAB.

36. The method as claimed in claim 26, wherein the new color space is CIELUV.

37. The method as claimed in claim 26, wherein for adjacent ones of the color signals, a misregistration determination determines all possible misregistration combinations for a color pair as an initial process.

38. The method as claimed in claim 37, wherein misregistration determination for adjacent ones of the color signals of the visibility values for each potential misregistration includes measurement of color difference using non-luminescence values between each color of the color pair, and each misregistration, in the color space.

39. The method as claimed in claim 26, wherein determining a trap color to be inserted into the image for trapping includes:
 providing a preselected set of trap colors to be used;
 determining a visibility value for each trap color; and
 determining a member of the preselected set of trap colors that should be used for trapping based on the visibility value of the trap color against the adjacent ones of the color signals.

40. The method as claimed in claim 26, wherein determining a trap color includes misregistering a combination of the original colors with the trap color prior to determining visibility values.

41. The method as claimed in claim 26, wherein any calculated visibility value is weighted by the probability of the corresponding misregistration occurring prior to modification of the image.

42. The method as claimed in claim 26, wherein the printing technology is xerographic in nature, and any image modifications are applied anamorphically.

43. The method as claimed in claim 26, wherein any calculated visibility value is weighted by the probability of the corresponding misregistration occurring.

44. The method as claimed in claim 26, wherein the non-luminescence values are hue and saturation values.

45. A method for printing colors with overlapped combinations of separately deposited separation colors, each separation color corresponding to a colorant, and providing a trapping processor to vary an image formed thereby to correct misregistration between colors due to imperfect placement of the separation colors, the method comprising:
   (a) identifying edges in the image where misregistration may occur;
   (b) receiving color signals representing sets of separations colors based on the identified edges;
   (c) converting the color signals to a color space in which equivalent color differences in human color perception are equivalent values;
   (d) determining, for adjacent ones of the color signals in the image in the new color space, a visibility value for each potential misregistration, the visibility value being determined using non-luminescence values of each adjacent ones of the color signals; and
   (e) modifying the image in response to the determination of the visibility value each potential misregistration.

46. A method for determining trapping requirements for images defined by overlapped combinations of separately deposited separation, whereby misregistration between colors due to imperfect placement of said separation colors might be mitigated, the method comprising:
   (a) receiving color signals representing sets of separations colors, for printing;
   (b) converting the color signals to a color space in which equivalent color differences in human color perception are equivalent values; and
   (c) determining, for adjacent ones of the color signals in the image in the new color space, a visibility value for each potential misregistration, the visibility value being determined using non-luminescence values of each adjacent ones of the color signals.

47. The method as claimed in claim 46, further comprising:
   (d) determining a trap color to be inserted into the image for trapping.

48. The method as claimed in claim 46, further comprising:
   (d) determining a position within the image at which a trapping modification should be placed.

49. The method as claimed in claim 46, further comprising:
   (d) receiving a device description describing printing characteristics for a selected device, and
   (e) modifying the determined visibility values to optimize trapping for a selected device in response to the received device description.

50. A trapping processor to determine trapping requirements for images defined by overlapped combinations of separately deposited separation, whereby misregistration between colors due to imperfect placement of the separation colors might be mitigated, comprising:
   a trap location processor to compute visibility values of a selected trap color against bounding colors, each visibility value being determined using non-luminescence values of the selected trap color and a bounding color;
   said trap location processor determining a position for the trap color as a function of the computed visibility values, said position varying, in correspondence with the calculated visibility values, across a misregistration region.

51. The processor as claimed in claim 50, wherein half-bitting is used to allow fractional pixel positioning across the misregistration region.

* * * * *